US012759342B2

(12) United States Patent
Ha et al.

(10) Patent No.: US 12,759,342 B2
(45) Date of Patent: Oct. 13, 2026

(54) MOVABLE OBJECT AND METHOD OF CONTROLLING THE SAME

(71) Applicants: HYUNDAI MOTOR COMPANY, Seoul (KR); KIA CORPORATION, Seoul (KR)

(72) Inventors: Ji Woo Ha, Suwon-si (KR); Hun Keon Ko, Anyang-si (KR); Kyung Min Kim, Seoul (KR); Hyeon Sik Shin, Hwaseong-si (KR); Tae Yu Kim, Suwon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 268 days.

(21) Appl. No.: 18/468,201

(22) Filed: Sep. 15, 2023

(65) Prior Publication Data

US 2024/0270014 A1 Aug. 15, 2024

(30) Foreign Application Priority Data

Feb. 14, 2023 (KR) ........................ 10-2023-0019694

(51) Int. Cl.

*B60B 19/04* (2006.01)
*B60B 25/02* (2006.01)
*B62D 57/02* (2006.01)

(52) U.S. Cl.

CPC .............. *B60B 19/04* (2013.01); *B60B 25/02* (2013.01); *B62D 57/022* (2013.01)

(58) Field of Classification Search

CPC ..... B60B 9/28; B60B 2900/551; B60B 19/00; B60B 19/003; B60B 19/04; B60B 15/22; B62D 57/022; B62D 57/024; B62D 63/02; A61G 5/06; A61G 5/061; B25J 5/007

See application file for complete search history.

(56) References Cited

U.S. PATENT DOCUMENTS

| | | | | |
|---|---|---|---|---|
| 2,454,130 | A * | 11/1948 | Braun | B60B 35/1009 279/2.19 |
| 3,672,458 | A | 6/1972 | Mackerle | |
| 7,165,637 | B2 * | 1/2007 | Tanielian | B62D 57/00 180/7.1 |
| 10,144,247 | B2 | 12/2018 | Joso et al. | |
| 10,455,752 | B2 * | 10/2019 | Ryan | A01B 29/04 |
| 11,060,564 | B2 * | 7/2021 | Lee | F16D 3/04 |
| 2006/0076215 | A1 | 4/2006 | Jahnke et al. | |
| 2008/0288128 | A1 * | 11/2008 | Gunderson | B62D 49/0635 701/1 |

(Continued)

FOREIGN PATENT DOCUMENTS

| | | |
|---|---|---|
| CN | 110901298 A | 3/2020 |
| JP | 5866643 | 2/2016 |

(Continued)

*Primary Examiner* — S. Joseph Morano
*Assistant Examiner* — Eva L Comino
(74) *Attorney, Agent, or Firm* — Fish & Richardson P.C.

(57) ABSTRACT

Disclosed is a movable object which includes a wheel assembly including a main rotary part that rotates about a first rotational axis and a variable rotary part that moves relative to the main rotary part in a direction not aligned with the first rotational axis. The variable rotary part rotates at the same angular velocity as a main angular velocity when the main rotary part rotates, the main angular velocity being an angular velocity of the main rotary part.

15 Claims, 12 Drawing Sheets

(56) References Cited

U.S. PATENT DOCUMENTS

| | | | | |
|---|---|---|---|---|
| 2015/0298501 | A1* | 10/2015 | Engel | B60B 1/00 301/95.101 |
| 2016/0068016 | A1* | 3/2016 | Winshtein | B60B 9/24 301/6.5 |
| 2017/0349003 | A1* | 12/2017 | Joso | B60G 13/04 |
| 2018/0073600 | A1 | 3/2018 | Lippman et al. | |
| 2020/0088756 | A1* | 3/2020 | Oh | B60W 40/105 |
| 2020/0292004 | A1 | 9/2020 | Lee | |
| 2021/0167675 | A1 | 6/2021 | Hunter et al. | |
| 2021/0214029 | A1 | 7/2021 | Mire | |
| 2021/0323346 | A1 | 10/2021 | Lee | |
| 2021/0354508 | A1* | 11/2021 | Flick | B60B 27/0068 |
| 2022/0379980 | A1* | 12/2022 | Choi | B62D 55/12 |
| 2023/0041624 | A1 | 2/2023 | Fujioka | |
| 2024/0239136 | A1* | 7/2024 | Ha | B60B 19/04 |
| 2024/0308268 | A1 | 9/2024 | Ha et al. | |

FOREIGN PATENT DOCUMENTS

| | | | | | |
|---|---|---|---|---|---|
| JP | 6761712 | | | 9/2020 | |
| JP | 6833222 | | | 2/2021 | |
| JP | 2022085844 | A | * | 6/2022 | A61G 5/06 |
| KR | 10-2017-0083854 | | | 7/2017 | |
| KR | 10-1875911 | | | 7/2018 | |
| KR | 10-2024-0138853 | A | | 9/2024 | |

* cited by examiner

MOVABLE OBJECT AND METHOD OF CONTROLLING THE SAME

CROSS-REFERENCE TO RELATED APPLICATION

This application claims the benefit of priority to Korean Patent Application No. 10-2023-0019694, filed in the Korean Intellectual Property Office on Feb. 14, 2023, the entire contents of which are incorporated herein by reference.

TECHNICAL FIELD

The present disclosure relates to a movable object and a method of controlling the same.

BACKGROUND

Robots can be broadly divided into a legged robot capable of walking motion using a leg-shaped structure and a wheeled robot capable of driving motion using wheels. However, the legged robot can have a problem in that it moves on the flat ground at a low speed and thus has poor energy use efficiency, and the wheeled robot can have a problem in that driving performance can be significantly deteriorated in an environment such as stairs or rough terrain. Therefore, in order to make up for the potential disadvantages of the legged robot and the wheeled robot, a movable object including a wheel assembly having a form in which the advantages of the two types of robots are integrated is being developed.

The movable object generally includes a main rotary part that rotates about a main rotational axis and a variable rotary part that receives power from the main rotary part and is movable relative to the main rotary part while rotating about a variable rotational axis. For example, the variable rotary part may move relative to the main rotary part such that the variable rotational axis moves away from or toward the main rotational axis.

Meanwhile, in the related art, during the movement of the variable rotary part of the movable object relative to the main rotary part, a variable angular velocity that is the angular velocity of the variable rotary part is different from a main angular velocity that is the angular velocity of the main rotary part input in advance. Therefore, separate control for correcting the difference between the main angular velocity and the variable angular velocity is additionally required to allow the variable angular velocity to reach a target angular velocity.

Accordingly, there is an increasing demand for a movable object having a structure in which a main angular velocity and a variable angular velocity are equal to each other without a separate control process.

SUMMARY

The present disclosure has been made to solve the above-mentioned problems occurring in the prior art while advantages achieved by the prior art are maintained intact.

An aspect of the present disclosure provides a movable object having a structure in which the angular velocity of a main rotary part and the angular velocity of a variable rotary part are equal to each other without a separate control process.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a movable object includes a wheel assembly including a main rotary part that rotates about a first rotational axis and a variable rotary part that moves relative to the main rotary part in a direction not aligned with the first rotational axis. The variable rotary part rotates at the same angular velocity as a main angular velocity when the main rotary part rotates, the main angular velocity being an angular velocity of the main rotary part.

The wheel assembly may further include a plurality of spokes, each of which includes an outer end portion moved at a spoke speed with respect to the first rotational axis by the rotation of the main rotary part and the relative movement of the variable rotary part when the movable object travels at a travel speed and a driving part including a first driving part that rotates the main rotary part and a second driving part that moves the variable rotary part relative to the main rotary part. The movable object may further include a controller that controls the driving part, and the controller may control the first driving part and the second driving part to increase the spoke speed of a spoke brought into contact with a ground among the plurality of spokes when an acceleration command is input to the controller such that the travel speed of the movable object is increased.

Inner end portions of the respective spokes may be connected to an edge of the variable rotary part so as to be rotatable. The plurality of spokes may be placed in a first posture in which the variable rotary part rotates about the first rotational axis. A travel speed of the movable object when the plurality of spokes are placed in the first posture and the main angular velocity is maximal may be referred to as a critical travel speed. When the acceleration command is input to the controller such that the travel speed of the movable object reaches a speed lower than the critical travel speed, the controller may control the first driving part such that the main angular velocity is increased and may control the second driving part such that the plurality of spokes are placed in the first posture.

The plurality of spokes may be additionally placed in a second posture in which the variable rotary part rotates about a second rotational axis spaced apart from the first rotational axis. When the acceleration command is input to the controller such that the travel speed of the movable object reaches a speed higher than the critical travel speed, the controller may control the first driving part such that the main angular velocity is increased to a maximum and may perform angle control to control the second driving part such that the plurality of spokes are switched from the first posture to the second posture.

A direction in which the movable object travels may be referred to as a travel direction, and a direction in which the variable rotary part rotates when the movable object travels in the travel direction may be referred to as a forward rotational direction. The inner end portions of the respective spokes may be connected to the edge of the variable rotary part in the forward rotational direction so as to be rotatable. When the angle control is performed, the second driving part may move the variable rotary part to increase an angle formed by a contact spoke having an outer end portion brought into contact with the ground among the plurality of spokes and an adjacent spoke adjacent to the contact spoke and disposed in a reverse rotational direction opposite to the forward rotational direction with respect to the contact spoke, among the plurality of spokes.

When the angle control is performed, the second driving part may move the variable rotary part toward an in-between region of the main rotary part formed between the contact spoke and the adjacent spoke as the movable object is viewed along the first rotational axis.

The movable object may further include a fixed driving part including a fixed driving arm having one end portion that rotates about a fixed center of rotation at a first rotational angular velocity and a variable driving part including a variable driving arm that has one end portion connected to the fixed driving arm and an opposite end portion connected to the variable rotary part and rotates about a variable center of rotation at a second rotational angular velocity, and the variable center of rotation may pass through the fixed driving arm and may be spaced apart from the fixed center of rotation. When the acceleration command is input to the controller such that the travel speed of the movable object reaches a target travel speed, the controller may determine a plurality of target spoke speeds being spoke speeds of the outer end portions of the plurality of spokes, may calculate the main angular velocity, the first rotational angular velocity, and the second rotational angular velocity based on the plurality of determined target spoke speeds, and may control the driving part based on the calculated main angular velocity, the calculated first rotational angular velocity, and the calculated second rotational angular velocity.

According to another aspect of the present disclosure, a method for controlling a movable object including a main rotary part that rotates about a first rotational axis, a variable rotary part that moves relative to the main rotary part and rotates at the same angular velocity as a main angular velocity being an angular velocity of the main rotary part, and a plurality of spokes, each of which includes an outer end portion moved at a spoke speed with respect to the first rotational axis by the rotation of the main rotary part and the relative movement of the variable rotary part includes a movable-object travel step in which the movable object travels at a travel speed, an input step in which an acceleration command is input to a controller to increase the travel speed of the movable object, and a speed control step in which the spoke speed of a spoke brought into contact with a ground among the plurality of spokes is increased when the acceleration command is input to the controller.

Inner end portions of the respective spokes may be connected to an edge of the variable rotary part. The plurality of spokes may be placed in a first posture in which the variable rotary part rotates about the first rotational axis. A travel speed of the movable object when the plurality of spokes are placed in the first posture and the main angular velocity is maximal may be referred to as a critical travel speed. The speed control step may include a rotation control step in which the main angular velocity is controlled and an angle control step in which postures of the plurality of spokes are controlled. When the acceleration command is input to the controller such that the travel speed of the movable object reaches a speed lower than the critical travel speed, the main angular velocity may be increased in the rotation control step, and the plurality of spokes may be placed in the first posture in the angle control step.

The plurality of spokes may be additionally placed in a second posture in which the variable rotary part rotates about a second rotational axis spaced apart from the first rotational axis. When the acceleration command is input to the controller such that the travel speed of the movable object reaches a speed higher than the critical travel speed, the main angular velocity may be increased to a maximum in the rotation control step, and the variable rotary part may be moved relative to the main rotary part in the angle control step such that the plurality of spokes are switched from the first posture to the second posture.

A direction in which the movable object travels may be referred to as a travel direction, and a direction in which the variable rotary part rotates while the movable object travels in the travel direction may be referred to as a forward rotational direction. The inner end portions of the respective spokes may be connected to the edge of the variable rotary part in the forward rotational direction. When the acceleration command is input to the controller such that the travel speed of the movable object reaches a speed higher than the critical travel speed, an angle formed by a contact spoke having one end portion brought into contact with the ground among the plurality of spokes and an adjacent spoke adjacent to the contact spoke and disposed in a reverse rotational direction opposite to the forward rotational direction among the plurality of spokes may be increased in the angle control step.

The speed control step may include a variable rotary part control step in which the variable rotary part is moved relative to the main rotary part. The variable rotary part control step may include a first rotation step in which one end portion of a fixed driving arm rotates about a fixed center of rotation at a first rotational angular velocity and a second rotation step in which a variable driving arm having one end portion connected to the fixed driving arm and an opposite end portion connected to the variable rotary part rotates about a variable center of rotation at a second rotational angular velocity, and the variable center of rotation may be spaced apart from the fixed center of rotation and may pass through the fixed driving arm. The method may further include a spoke speed determination step in which a plurality of target spoke speeds being spoke speeds of the outer end portions of the plurality of spokes are determined when the acceleration command is input to the controller such that the travel speed of the movable object reaches a target travel speed and a calculation step in which the main angular velocity, the first rotational angular velocity, and the second rotational angular velocity are calculated based on the plurality of target spoke speeds determined in the spoke speed determination step. In the speed control step, the main rotary part may rotate based on the main angular velocity, the first rotational angular velocity, and the second rotational angular velocity calculated in the calculation step, and the variable rotary part may be moved relative to the main rotary part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
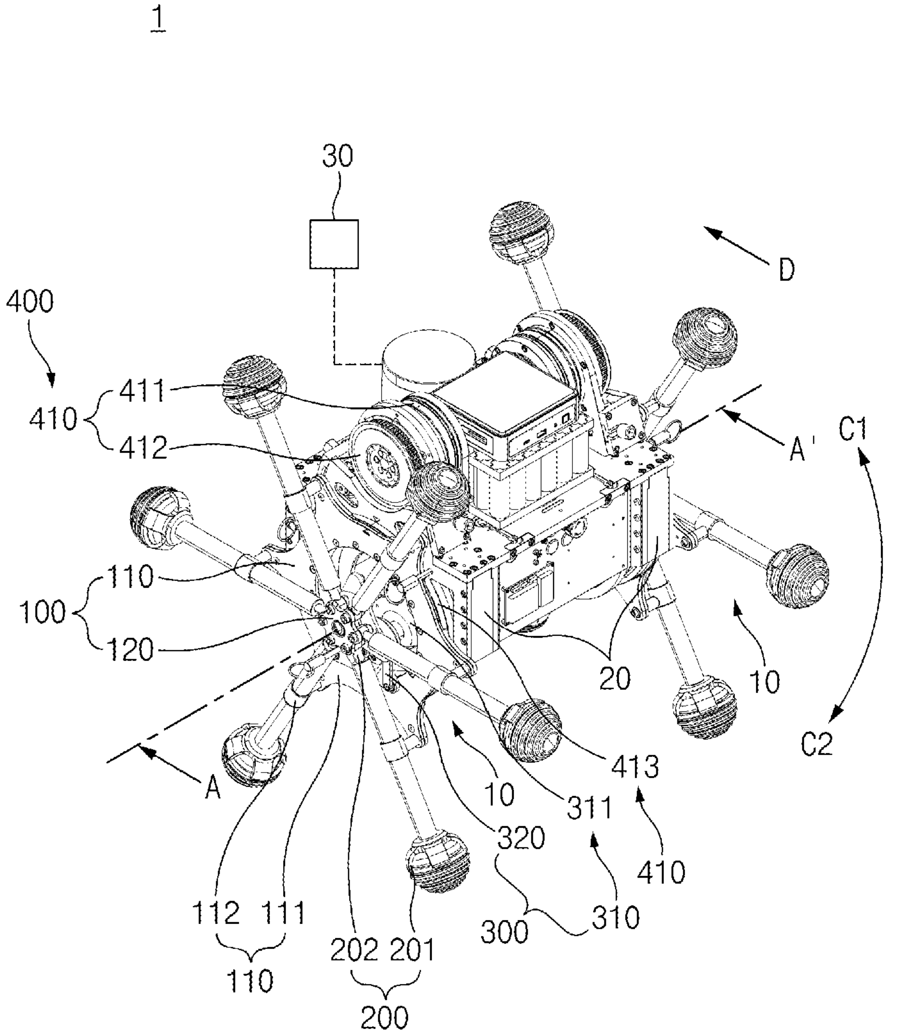
FIG. 1 is a perspective view of a movable object according to an implementation of the present disclosure.
Figure 2:
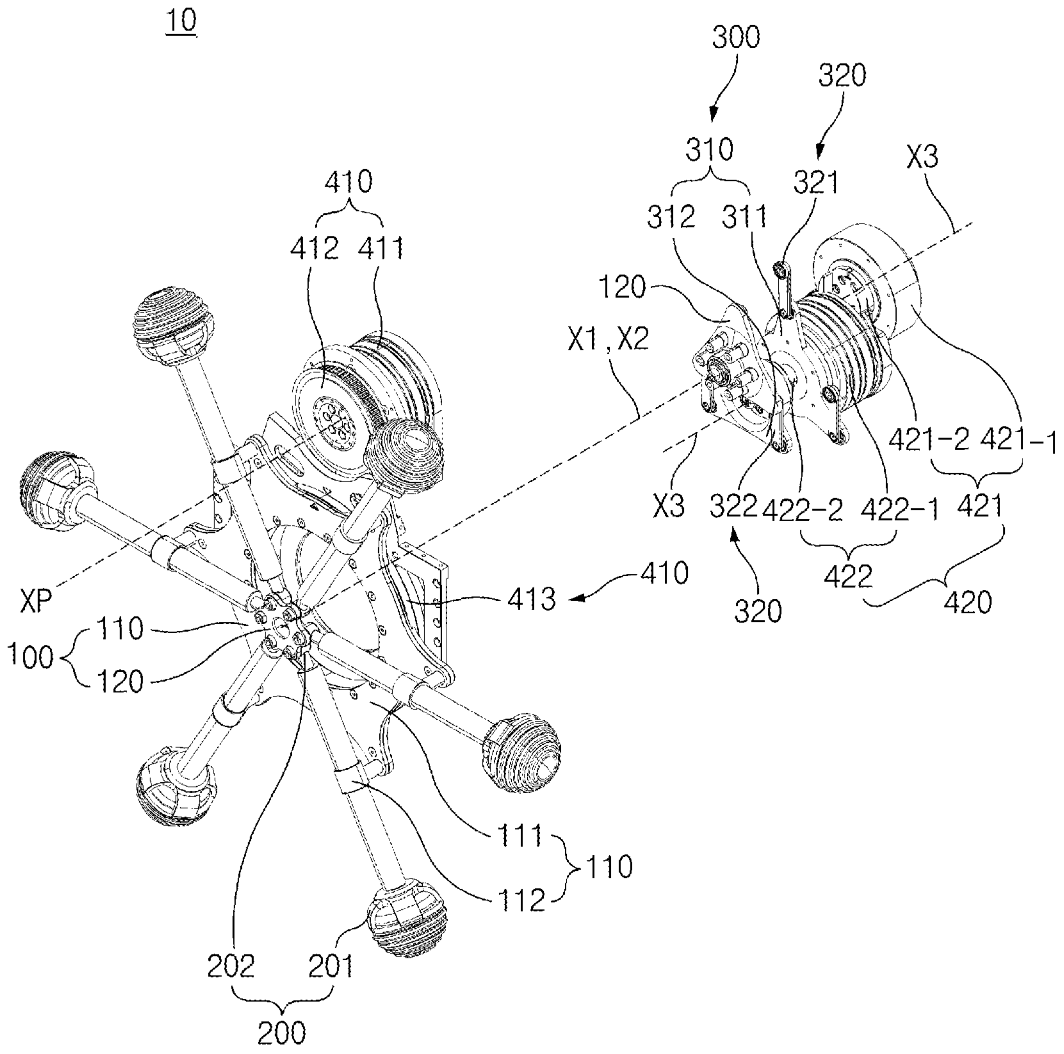
FIG. 2 is an exploded perspective view of a wheel assembly according to an implementation of the present disclosure.
Figure 3:
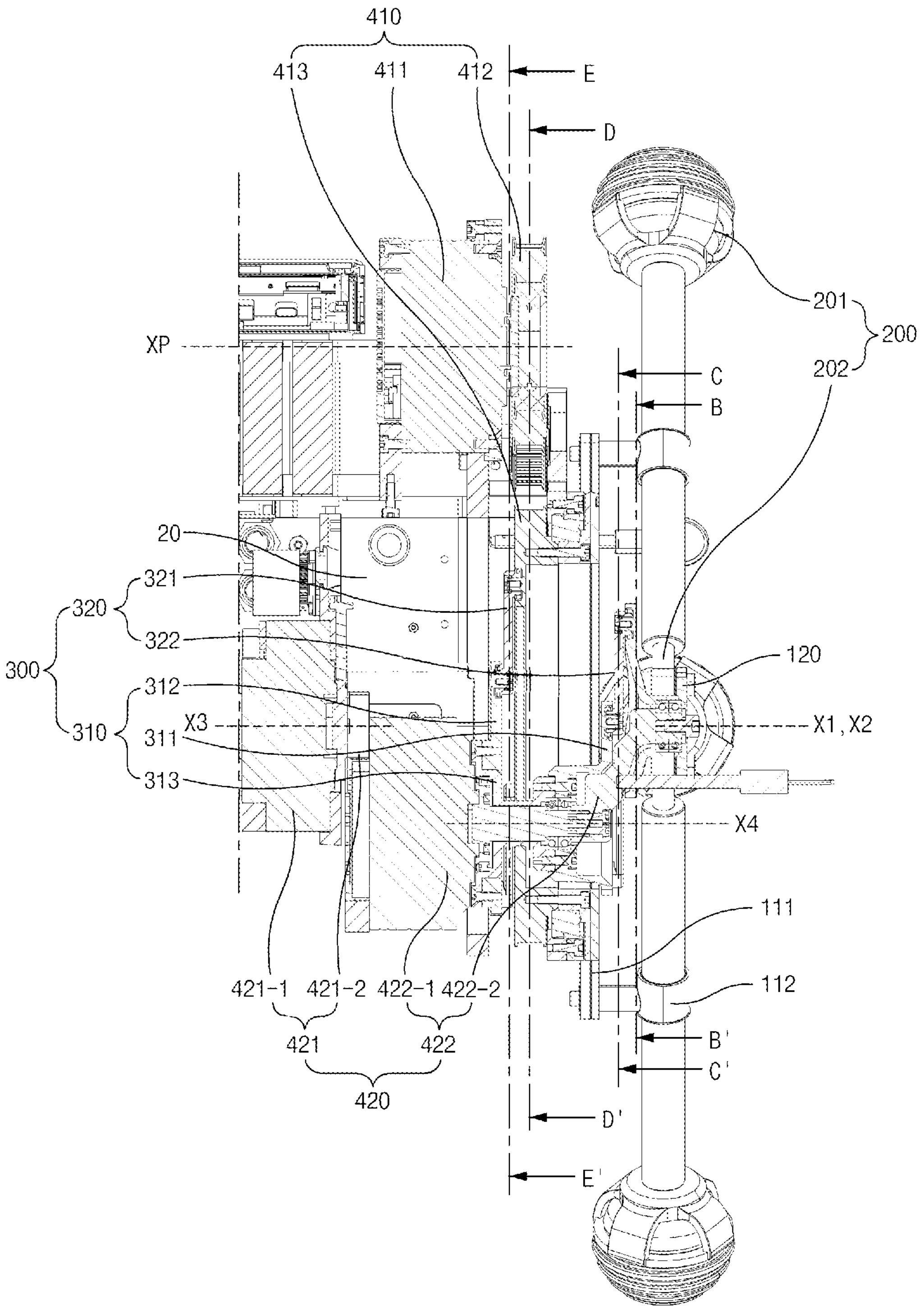
FIG. 3 is a sectional view of the wheel assembly taken along line A-A' of FIG. 1.
Figure 4:
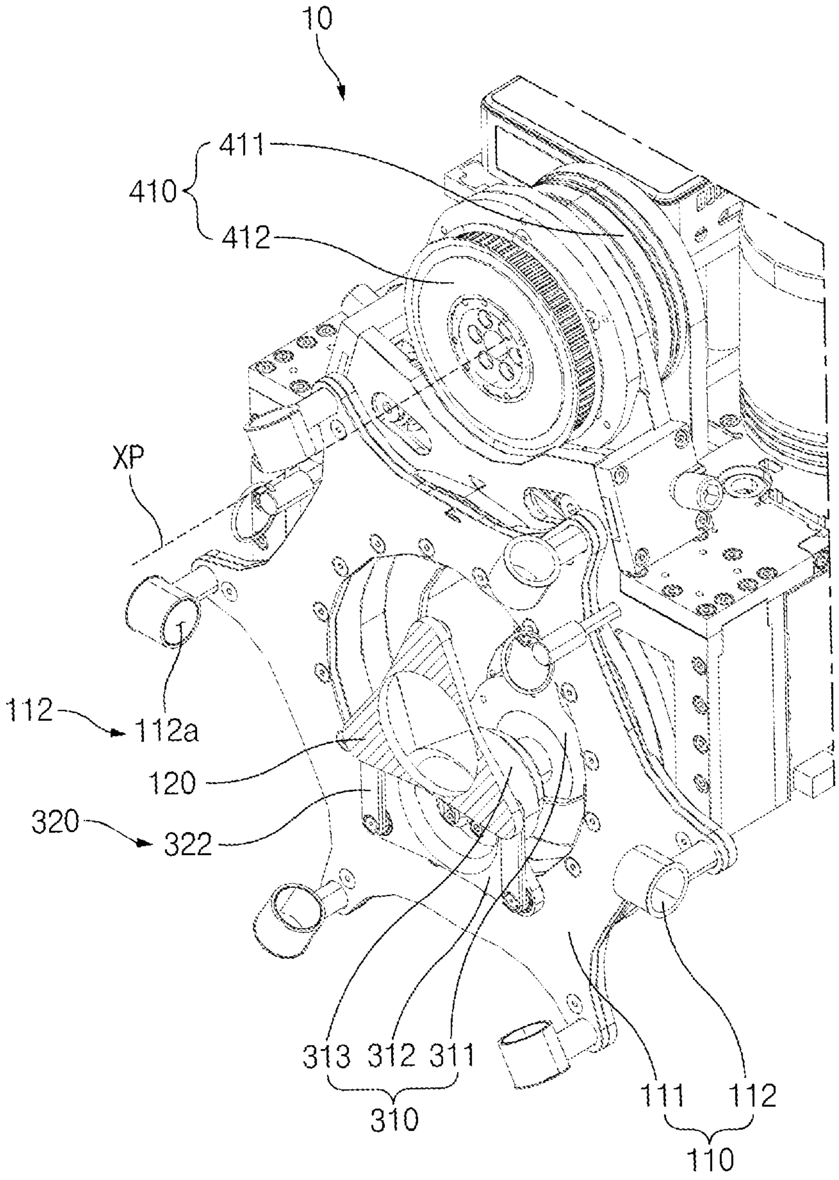
FIG. 4 is a sectional perspective view of the wheel assembly taken along line B-B' of FIG. 3.
Figure 5:
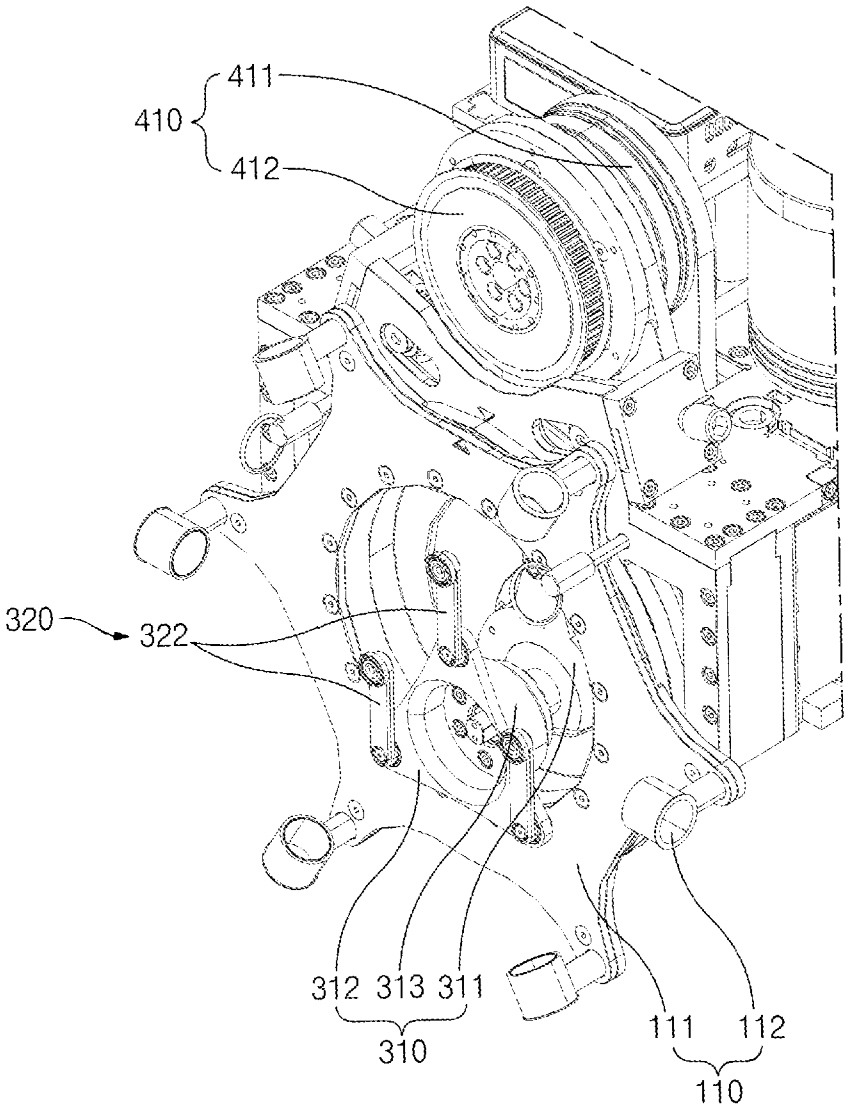
FIG. 5 is a sectional perspective view of the wheel assembly taken along line C-C' of FIG. 3.
Figure 6:
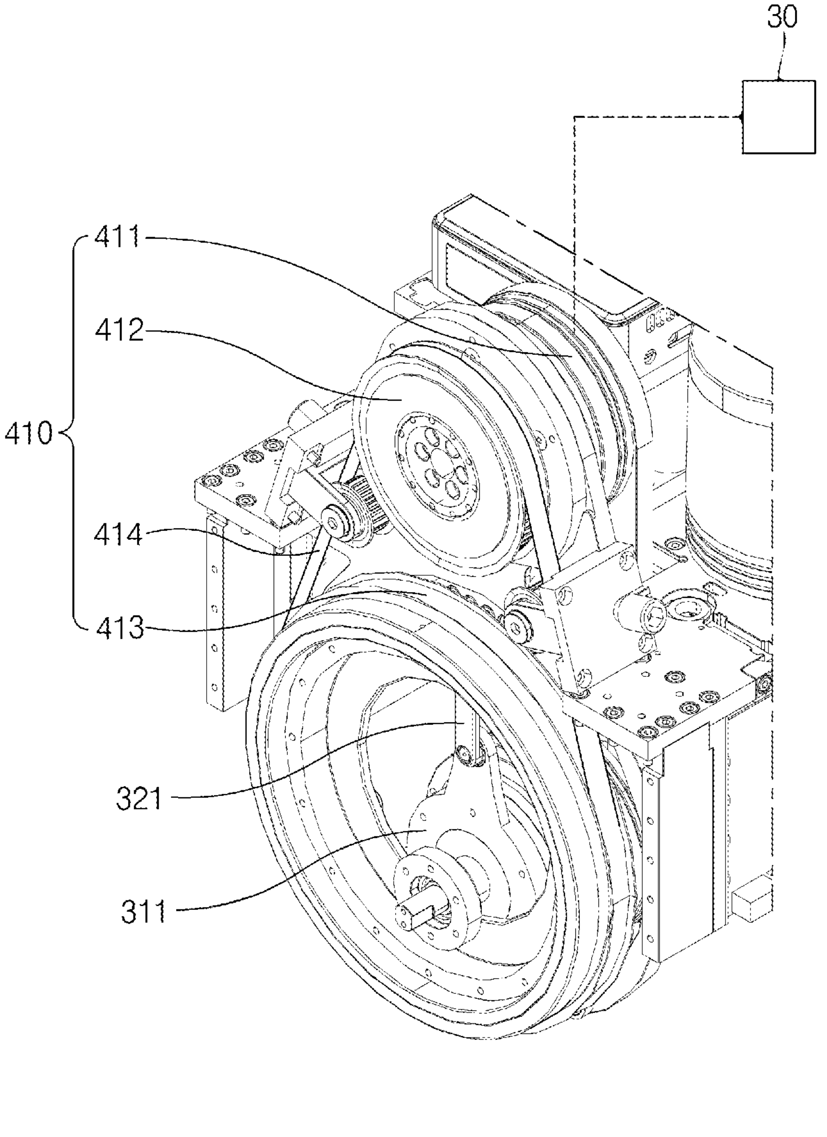
FIG. 6 is a sectional perspective view of the wheel assembly taken along line D-D' of FIG. 3.
Figure 7:
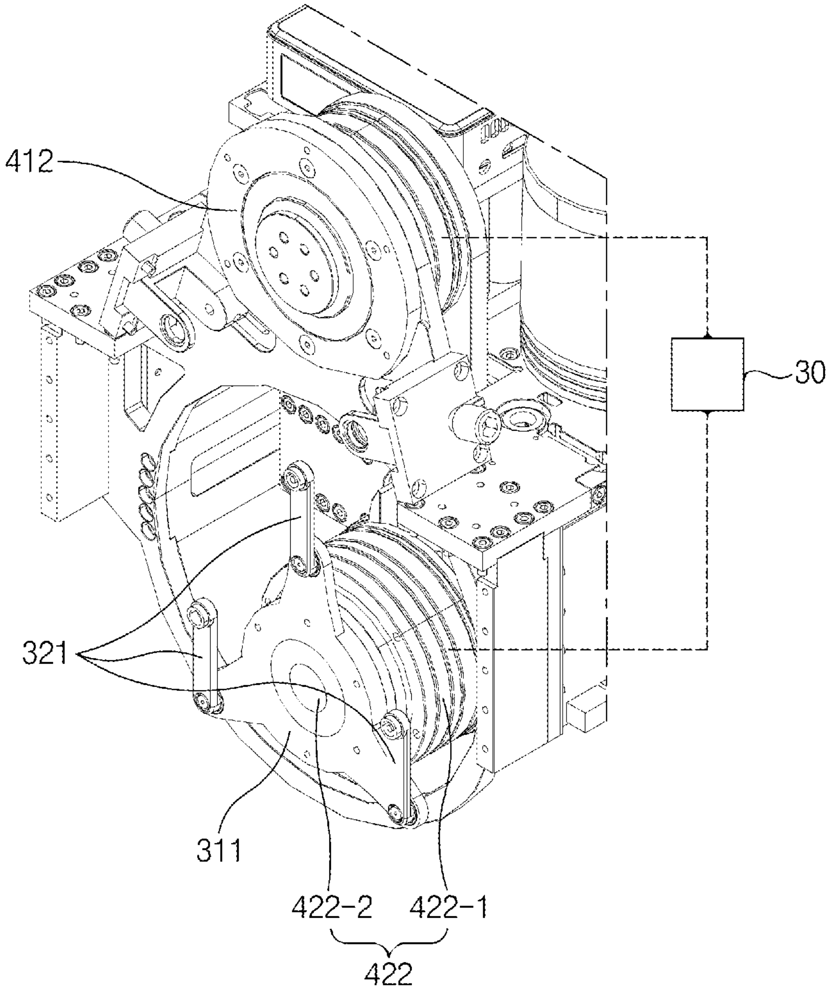
FIG. 7 is a sectional perspective view of the wheel assembly taken along line E-E' of FIG. 3.
Figure 8:
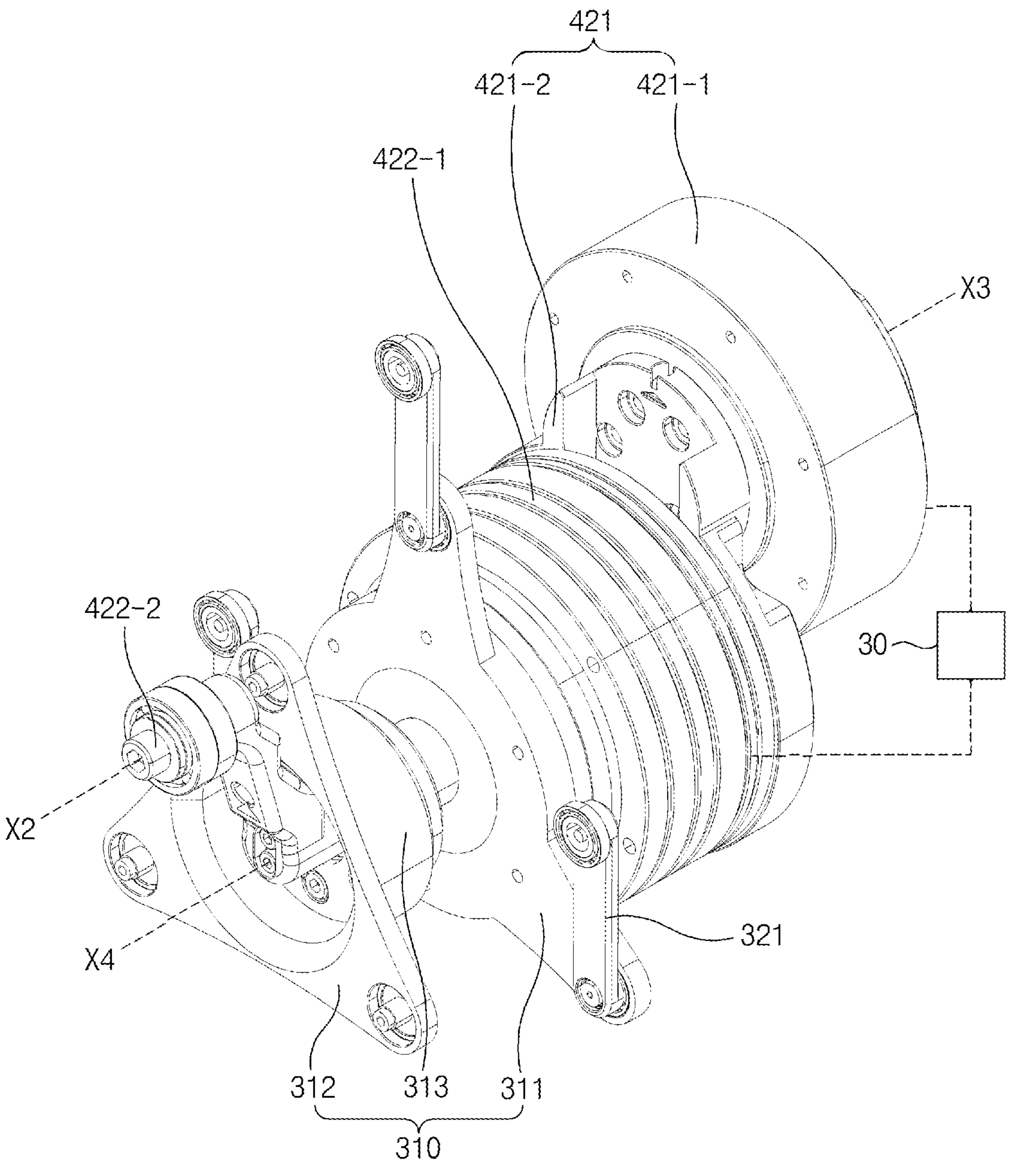
FIG. 8 is a perspective view of a power transmission part and a driving part according to an implementation of the present disclosure.
Figure 9:
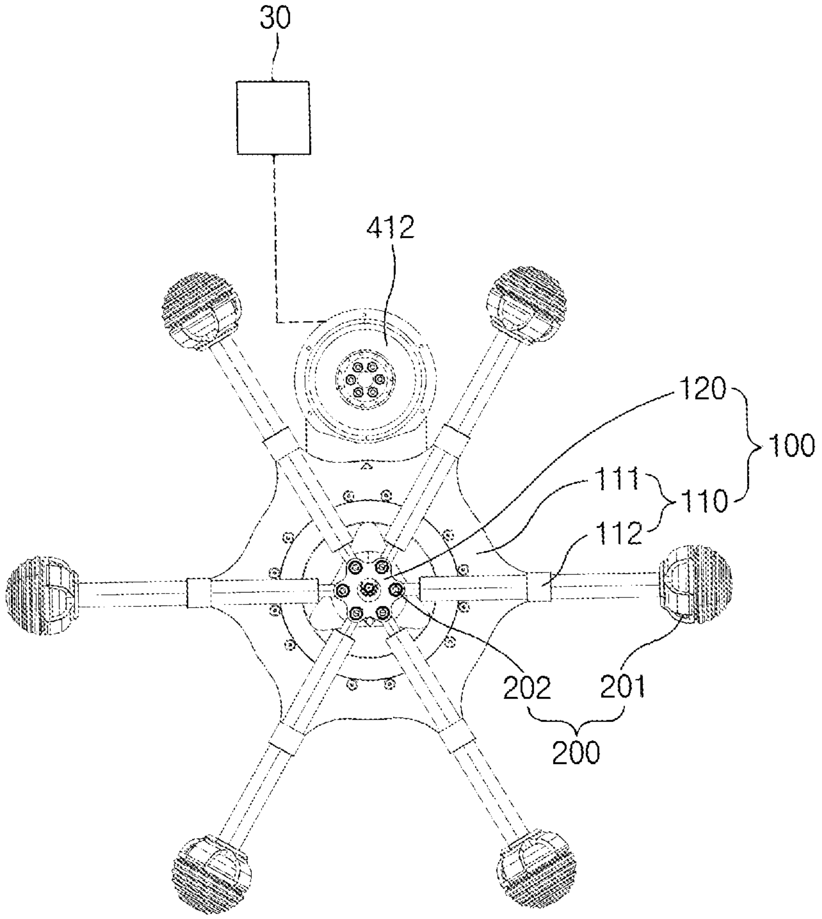
FIG. 9 is a side view of the movable object in a state in which a plurality of spokes are placed in a first posture according to an implementation of the present disclosure.
Figure 10:
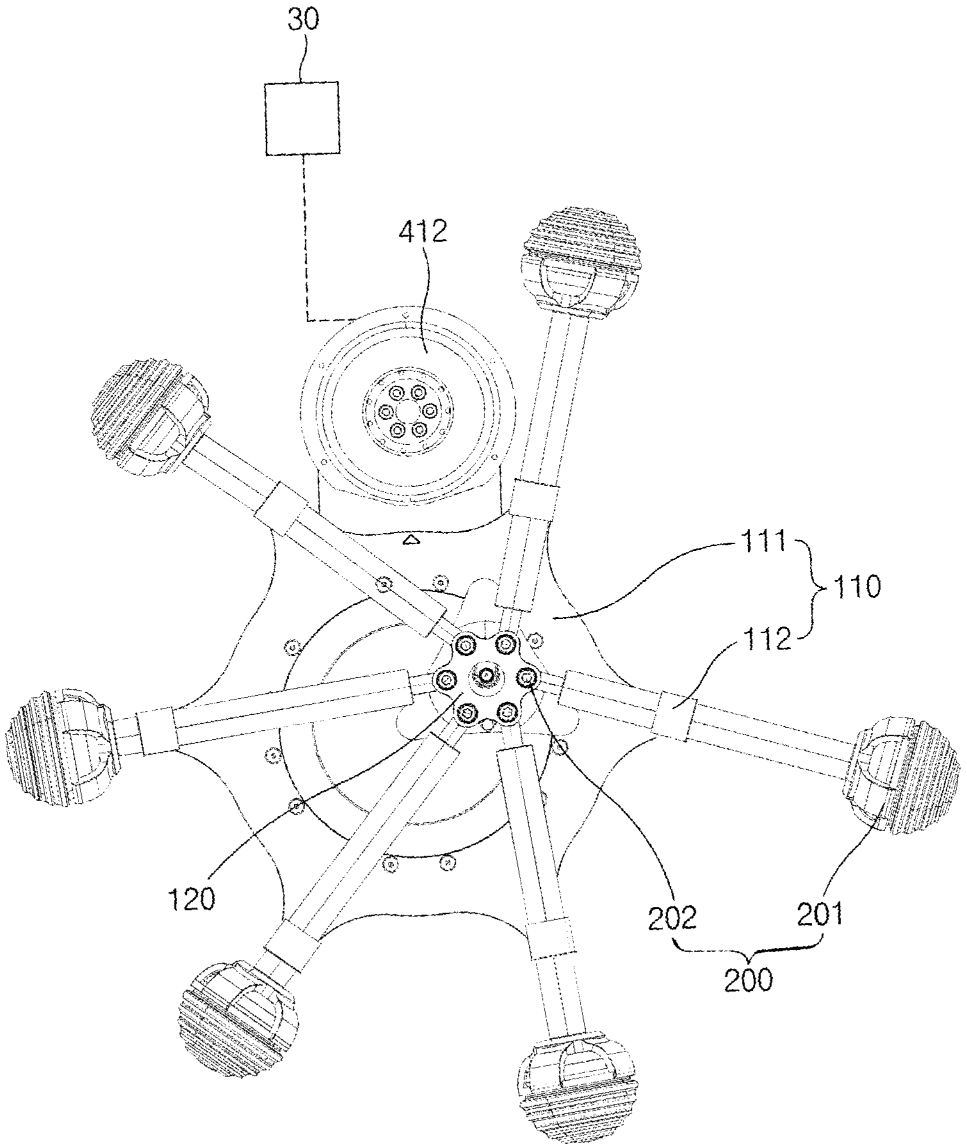
FIG. 10 is a side view of the movable object in a state in which the plurality of spokes are placed in a second posture according to an implementation of the present disclosure.

Hereinafter, some implementations of the present disclosure will be described in detail with reference to the exemplary drawings. In adding the reference numerals to the components of each drawing, it should be noted that the identical or equivalent component is designated by the identical numeral even when they are displayed on other drawings. Further, in describing the implementation of the present disclosure, a detailed description of well-known features or functions will be ruled out in order not to unnecessarily obscure the gist of the present disclosure.

Hereinafter, a movable object 1 according to an implementation of the present disclosure will be described with reference to the accompanying drawings.

Referring to FIG. 1, the movable object 1 according to the present disclosure may travel on the ground. The movable object 1 may effectively pass through the ground having steps, such as stairs, by changing a posture depending on the state of the ground. In addition, the movable object 1 may implement a movement that mimics a person's walking motion. The movable object 1 may include a wheel assembly 10, a frame 20, and a controller 30.

Referring further to FIGS. 2 to 10, the wheel assembly 10 may travel toward a target position together with the frame 20 in a state of being supported by the frame 20. The wheel assembly 10 may be provided in plural numbers. The plurality of wheel assemblies 10 may be disposed on opposite sides of the frame 20. For example, the plurality of wheel assemblies 10 may be disposed to face each other. Each of the wheel assemblies 10 may include a rotary part 100, a spoke 200, a power transmission part 300, and a driving part 400.

Referring again to FIG. 3, the rotary part 100 may be rotated relative to the frame 20. In addition, the rotary part 100 may transmit power to the spoke 200. The rotary part 100 may include a main rotary part 110 and a variable rotary part 120.

The main rotary part 110 may be rotated about a first rotational axis X1. The position of the first rotational axis X1 relative to the frame 20 may be fixed. The first rotational axis X1 may be defined as a virtual straight line passing through the center of the main rotary part 100 and extending in an axial direction. The axial direction may be defined as a direction perpendicular to a travel direction D and an up/down direction. The travel direction D may be defined as a direction in which the movable object 1 is moved relative to the ground. The main rotary part 100 may include a main rotary body 111 and a rotation support part 112.

Referring again to FIG. 4, the main rotary body 111 may form the exterior of the main rotary part 110. The main rotary body 111 may have an empty space formed therein. For example, the main rotary body 111 may have a ring shape in which a hole is formed at the center.

The rotation support part 112 may be connected to an edge of the main rotary body 111 so as to be rotatable. For example, the rotation support part 112 may be rotated relative to the main rotary body 111 about a rotational axis passing through the edge of the main rotary body 111 and extending in the axial direction. The rotation support part 112 may support the spoke 200. The rotation support part 112 may be connected to an outside of the main rotary body 111. An outer direction may be defined as a direction in which the frame 20 faces toward the main rotary part 110, and an inner direction may be defined as a direction opposite to the outer direction. The rotation support part 112 may have a guide hole **112*a*** formed therein.

Referring again to FIG. 4, the guide hole **112*a* may be a through-hole formed in a central portion of the rotation support part 112 in a direction perpendicular to the axial direction. The spoke 200 may be inserted into the guide hole 112*a*. The guide hole 112*a* may guide a movement of the spoke 200. For example, the guide hole 112*a* may guide a translational motion of the spoke 200 relative to the rotation support part 112. In other words, the spoke 200 may slide relative to the rotation support part 112 along the guide hole 112*a***.

Referring again to FIG. 1, the rotation support part 112 may be provided in plural numbers. The plurality of rotation support parts 112 may be arranged to be spaced apart from each other in rotational directions C1 and C2. The rotational directions C1 and C2 may be defined as directions in which the main rotary part 110 is rotated about the first rotational axis X1. The rotational directions C1 and C2 may be understood as a concept including the forward rotational direction C1 and the reverse rotational direction C2. The forward rotational direction C1 may be defined as a direction in which the main rotary part 110 is rotated when the movable object 1 is moved in the travel direction D. The reverse rotational direction C2 may be defined as a direction opposite to the forward rotational direction.

The plurality of rotation support parts 112 may include a first rotation support part and a second rotation support part. The first rotation support part and the second rotation support part may be defined as any two rotation support parts 112 adjacent to each other among the plurality of rotation support parts 112.

Referring again to FIGS. 9 and 10, when the variable rotary part 120 is moved relative to the main rotary part 110 toward a side region, each of the first rotation support part and the second rotation support part may be rotated relative to the main rotary body 111 such that the angle formed by a first straight line and a second straight line is increased. The first straight line may be defined as a virtual straight line passing through the center of the first rotation support part and extending along a guide hole of the first rotation support part. Furthermore, the second straight line may be defined as a virtual straight line passing through the center of the second rotation support part and extending along a guide hole of the second rotation support part. In addition, the side region may be defined as a region of the edge of the main rotary body 111 formed between the first rotation support part and the second rotation support part. For example, the side region may be defined as a region disposed between the first rotation support part and the second rotation support part when the wheel assembly 10 is viewed in the axial direction.

The variable rotary part 120 may be rotated about a second rotational axis X2. For example, the second rotational axis X2 may be defined as a virtual straight line passing through the center of the variable rotary part 120 and extending parallel to the axial direction. In other words, the second rotational axis X2 may be parallel to the first rotational axis X1. Furthermore, a variable angular velocity that is the angular velocity of the variable rotary part 120 may be equal to a main angular velocity that is the angular velocity of the main rotary part 110. The relationship between the variable angular velocity and the main angular velocity will be described in more detail in the description of the power transmission part 300 to be described below.

The variable rotary part 120 may be moved relative to the main rotary part 110 in a relative movement direction that is not aligned with the axial direction. For example, the relative movement direction may be a direction perpendicular to the axial direction. The variable rotary part 120 may be moved relative to the main rotary part 110 such that the second rotational axis X2 and the first rotational axis X1 overlap each other or are spaced apart from each other. The variable rotary part 120 may be moved relative to the main rotary part 110 on an allowable movement region crossing the first rotational axis X1.

The allowable movement region may be defined as a region through which the center of the variable rotary part 120 passes when the variable rotary part 120 is moved relative to the main rotary part 110. The allowable movement region may be surrounded by a virtual circle that is centered at the point where the allowable movement region and the first rotational axis X1 cross each other and that has a radius equal to the sum of a first driving distance and a second driving distance to be described below. The first driving distance may be defined as a separation distance between a fixed center of rotation X3 and a variable center of rotation X4 to be described below. Furthermore, the second driving distance may be defined as a separation distance between the second rotational axis X2 and the variable center of rotation X4. The sum of the first driving distance and the second driving distance may be smaller than a separation distance between the center of the main rotary body 111 and the rotation support part 112. Since the sum of the first driving distance and the second driving distance is smaller than the separation distance between the center of the main rotary body 111 and the rotation support part 112, interference between the variable rotary part 120 and the rotation support part 112 may be restricted.

The variable rotary part 120 may be disposed outward of the main rotary part 110. The variable rotary part 120 may cross a virtual plane that passes through the center of the rotation support part 112 and is perpendicular to the axial direction.

Referring again to FIGS. 2 and 3, the spoke 200 may provide a ground reaction force to the movable object 1. The movable object 1 may travel on the ground through the ground reaction force transmitted from the spoke 200. An outer end portion 201 of the spoke may be brought into contact with the ground. The outer end portion 201 of the spoke may have, for example, a ball shape. The outer end portion 201 of the spoke may be formed of a material (e.g., a rubber material) capable of restricting a slip on the ground. An inner end portion 202 of the spoke may be connected to an edge of the variable rotary part 120 so as to be rotatable.

Referring again to FIG. 10, the spoke 200 may perform a translational motion along the guide hole **112*a* when the variable rotary part 120 is moved relative to the main rotary part 110. For example, when the variable rotary part 120 is moved toward the rotation support part 112 relative to the main rotary part 110, the outer end portion 201 of the spoke may perform a translational motion to move away from the rotation support part 112. In other words, when the variable rotary part 120 is moved toward the rotation support part 112 relative to the main rotary part 110, the separation distance between the outer end portion 201 of the spoke and the rotation support part 112** may be increased.

Furthermore, when the variable rotary part 120 is moved away from the rotation support part 112 relative to the main rotary part 110, the outer end portion 201 of the spoke may perform a translational motion to move toward the rotation support part 112. In other words, when the variable rotary part 120 is moved away from the rotation support part 112 relative to the main rotary part 110, the separation distance between the outer end portion 201 of the spoke and the rotation support part 112 may be decreased.

The spoke 200 may be provided in plural numbers. The plurality of spokes 200 may correspond to the plurality of rotation support parts 112, respectively. For example, when n rotation support parts 112 ($n>2$) are provided, n spokes 200 may be provided so as to be inserted into the guide holes **112*a* of the n rotation support parts 112, respectively. The plurality of spokes 200 may be connected to the edge of the variable rotary part 120 so as to be rotatable. For example, the plurality of spokes 200 may be arranged to be spaced apart from each other in a circumferential direction of the variable rotary part 120. The circumferential direction of the variable rotary part 120 may be defined as a direction in which the variable rotary part 120** is rotated about the second rotational axis X2.

The plurality of spokes 200 may be placed in one of a first posture and a second posture. Referring again to FIG. 9, the first posture may be defined as a posture of the plurality of spokes 200 in a state in which the first rotational axis X1 and the second rotational axis X2 overlap each other. Furthermore, referring again to FIG. 10, the second posture may be defined as a posture of the plurality of spokes 200 in a state in which the first rotational axis X1 and the second rotational axis X2 are spaced apart from each other.

Referring again to FIG. 10, when each of the first rotation support part and the second rotation support part is rotated relative to the main rotary body 111 such that the angle formed by the first straight line and the second straight line is increased, an outer end portion of a first spoke and an outer end portion of a second spoke may move away from each other. The first spoke may be defined as a spoke 200 corresponding to the first rotation support part among the plurality of spokes 200. The second spoke may be defined as a spoke 200 corresponding to the second rotation support part among the plurality of spokes 200.

Referring again to FIGS. 5 to 8, the power transmission part 300 may receive power from the main rotary part 110. The power transmission part 300 may transmit the power received from the main rotary part 110 to the variable rotary part 120. For example, the main rotary part 110, the variable rotary part 120, and the power transmission part 300 may be coupled together in a Schmidt coupling manner. For example, when the main rotary part 110 is rotated at the main angular velocity, the power transmission part 300 may receive torque from the main rotary part 110 and may be rotated at the same angular velocity as the main angular velocity. When the power transmission part 300 is rotated, the variable rotary part 120 may receive torque from the power transmission part 300 and may be rotated at the same angular velocity as the rotational angular velocity of the power transmission part 300. In other words, the main angular velocity, the rotational angular velocity of the power transmission part 300, and the variable angular velocity may be the same. The power transmission part 300 may include an intermediate rotary part 310 and a link part 320.

Referring again to FIG. 8, the intermediate rotary part 310 may receive power from the main rotary part 110 and may be rotated about an intermediate rotational axis passing through the center of the intermediate rotary part 310 and extending parallel to the axial direction. The intermediate rotary part 310 may include a first intermediate rotary part 311, a second intermediate rotary part 312, and an intermediate rotary body 313.

When the main rotary part 110 is rotated, the first intermediate rotary part 311 may be rotated by receiving power from a first link part 321 to be described below. The first intermediate rotary part 311 may transmit power to the intermediate rotary body 313. The first intermediate rotary part 311 may be disposed inward of the main rotary part 110.

When the intermediate rotary body 313 is rotated, the second intermediate rotary part 312 may be rotated by receiving power from the intermediate rotary body 313. The second intermediate rotary part 312 may transmit power to a second link part 322 to be described below. The second intermediate rotary part 312 may be disposed outward of the main rotary part 110. For example, the main rotary part 110 may be disposed between the first intermediate rotary part 311 and the second intermediate rotary part 312. Specifically, the first intermediate rotary part 311, the main rotary part 110, and the second intermediate rotary part 312 may be sequentially disposed in the outer direction.

The intermediate rotary body 313 may extend in the axial direction between the first intermediate rotary part 311 and the second intermediate rotary part 312. For example, an inner end portion of the intermediate rotary body 313 may be connected with the first intermediate rotary part 311, and an outer end portion of the intermediate rotary body 313 may be connected with the second intermediate rotary part 312. The intermediate rotary body 313 may be disposed in the empty space of the main rotary body 111. For example, the intermediate rotary body 313 may be disposed to pass through the empty space of the main rotary body 111.

The link part 320 may include the first link part 321 and a second link part 322. The first link part 321 may transmit the power of the main rotary part 110 to the first intermediate rotary part 311. A first end portion of the first link part 321 may be connected to an inner surface of the main rotary body 111 so as to be rotatable. A second end portion of the first link part 321 may be connected to an outer surface of the first intermediate rotary part 311 so as to be rotatable. The first link part 321 may be provided in plural numbers.

Separation distances between first end portions and second end portions of the plurality of first link parts 321 may be the same. The first end portions of the plurality of first link parts 321 may be symmetrically disposed with respect to the center of the main rotary body 111. The second end portions of the plurality of first link parts 321 may be symmetrically disposed with respect to the center of the first intermediate rotary part 311.

The second link part 322 may transmit the power of the second intermediate rotary part 312 to the variable rotary part 120. A first end portion of the second link part 322 may be connected to an inner surface of the variable rotary part 120 so as to be rotatable. A second end portion of the second link part 322 may be connected to an outer surface of the second intermediate rotary part 312 so as to be rotatable. The second link part 322 may be provided in plural numbers.

Separation distances between first end portions and second end portions of the plurality of second link parts 322 may be the same. The first end portions of the plurality of second link parts 322 may be symmetrically disposed with respect to the center of the variable rotary part 120. The second end portions of the plurality of second link parts 322 may be symmetrically disposed with respect to the center of the second intermediate rotary part 312.

Referring again to FIGS. 6 and 8, the driving part 400 may provide power to the rotary part 100. The driving part 400 may include a first driving part 410 and a second driving part 420. The first driving part 410 may provide power to the main rotary part 110. The first driving part 410 may include a main rotary motor 411, a driving pulley 412, a driven pulley 413, and a driving belt 414.

The main rotary motor 411 may rotate the driving pulley 412 about a pulley rotation axis XP. The pulley rotation axis XP may be defined as a virtual straight line passing through the center of the driving pulley 412 and extending in the axial direction. The pulley rotation axis XP may be spaced apart from the allowable movement region. For example, the pulley rotation axis XP may be disposed above the allowable movement region. The main rotary motor 411 may be supported by the frame 20 such that the position of the main rotary motor 411 relative to the frame 20 is fixed.

The driving pulley 412 may be rotated about the pulley rotation axis XP. The driving pulley 412 may provide power to the driving belt 414. The driving pulley 412 may have, for example, a disk shape having an empty space formed therein.

The driven pulley 413 may receive power from the driving belt 414 and may be rotated about the first rotational axis X1. The driven pulley 413 may be connected to the main rotary part 110. For example, the driven pulley 413 may be connected to the inner surface of the main rotary body 111. The driven pulley 413 may provide power to the main rotary body 111. For example, the driven pulley 413 and the main rotary body 111 may be rotated together about the first rotational axis X1. The driven pulley 413 may have, for example, a disk shape having an empty space formed therein. For example, the driven pulley 413 may have a hollow disk shape having a larger radius than the driving pulley 412.

The driving belt 414 may receive power from the driving pulley 412. The driving belt 414 may transmit the power received from the driving pulley 412 to the driven pulley 413. The driving belt 414 may be disposed to surround the driving pulley 412 and the driven pulley 413.

The second driving part 420 may move the variable rotary part 120 relative to the main rotary part 110. Furthermore, the first driving part 410 and the second driving part 420 may be driven independently of each other. The second driving part 420 may include a fixed driving part 421 and a variable driving part 422.

The fixed driving part 421 may be supported by the frame 20 such that the position of the fixed driving part 421 relative to the frame 20 is fixed. The fixed driving part 421 may be disposed inward of the rotary part 100. The fixed driving part 421 may include a fixed motor 421-1 and a fixed driving arm 421-2.

The fixed motor 421-1 may provide power to the fixed driving arm 421-2. The fixed motor 421-1 may provide a fixed center of rotation X3. The fixed center of rotation X3 may be defined as a virtual straight line passing through the fixed driving arm 421-2 and extending in the axial direction. The position of the fixed center of rotation X3 relative to the first rotational axis X1 may be fixed. For example, the fixed center of rotation X3 may overlap the first rotational axis X1. Furthermore, the fixed center of rotation X3 and the second rotational axis X2 may be in one of an overlapping state in which the fixed center of rotation X3 and the second rotational axis X2 overlap each other and a separation state in which the fixed center of rotation X3 and the second rotational axis X2 are spaced apart from each other.

One end portion of the fixed driving arm 421-2 may be rotated about the fixed center of rotation X3. The one end portion of the fixed driving arm 421-2 may be connected to the variable driving part 422. For example, the one end portion of the fixed driving arm 421-2 may be rotated about the fixed center of rotation X3 together with the variable driving part 422. An opposite end portion of the fixed driving arm 421-2 may be connected to the fixed motor 421-1. Furthermore, the fixed center of rotation X3 may cross the opposite end portion of the fixed driving arm 421-2.

The position of the variable driving part 422 relative to the frame 20 may be changed. The variable driving part 422 may be supported by the fixed driving arm 421-2. The variable driving part 422 may be disposed outward of the fixed driving part 421. For example, the variable driving part 422 may be connected to the outside of the one end portion of the fixed driving arm 421-2. Furthermore, the fixed driving part 421 and the variable driving part 422 may be driven independently of each other. The variable driving part 422 may include a variable motor 422-1 and a variable driving arm 422-2.

The variable motor 422-1 may provide power to the variable driving arm 422-2. The variable motor 422-1 may provide a variable center of rotation X4. The variable center of rotation X4 may be defined as a virtual straight line passing through the one end portion of the fixed driving arm 421-2 and extending in the axial direction. The variable center of rotation X4 may be spaced apart from the fixed center of rotation X3. Furthermore, the variable center of rotation X4 may cross the allowable movement region.

One end portion of the variable driving arm 422-2 may be connected to the one end portion of the fixed driving arm 421-2. Furthermore, an opposite end portion of the variable driving arm 422-2 may be connected to the variable rotary part 120 so as to be rotatable. For example, the opposite end portion of the variable driving arm 422-2 may not be rotated by rotation of the variable rotary part 120. In other words, the variable rotary part 120 may be rotated relative to the opposite end portion of the variable driving arm 422-2.

The opposite end portion of the variable driving arm 422-2 may be rotated about the variable center of rotation X4. The opposite end portion of the variable driving arm 422-2 may cross the second rotational axis X2. The second rotational axis X2 may pass through the opposite end portion of the variable driving arm 422-2 and the center of the variable rotary part 120. Furthermore, the second rotational axis X2 may be spaced apart from the variable center of rotation X4.

The frame 20 may support the plurality of wheel assemblies 10.

Hereinafter, a process in which a rotational force is generated in the variable rotary part 120 will be described.

When the main rotary motor 411 is driven, the driving pulley 412 may be rotated about the pulley rotation axis XP. When the driving pulley 412 is rotated, the driven pulley 413 may be rotated about the first rotational axis X1 through the driving belt 414. When the driven pulley 413 is rotated, the main rotary body 111 may be rotated about the first rotational axis X1 together with the driven pulley 413. When the main rotary body 111 is rotated, the first intermediate rotary part 311 may be rotated about the intermediate rotational axis through the first link part 321. When the first intermediate rotary part 311 is rotated, the intermediate rotary body 313 and the second intermediate rotary part 312 may be rotated about the intermediate rotational axis. When the second intermediate rotary part 312 is rotated, the variable rotary part 120 may be rotated about the second rotational axis X2 through the second link part 322.

Hereinafter, a process in which power is generated in the variable rotary part 120 such that the variable rotary part 120 is moved relative to the main rotary part 110 will be described.

When the fixed motor 421-1 is driven, the one end portion of the fixed driving arm 421-2 may be rotated about the fixed center of rotation X3. When the one end portion of the fixed driving arm 421-2 is rotated, the variable motor 422-1 may be rotated about the fixed center of rotation X3 together with the one end portion of the fixed driving arm 421-2. When the variable motor 422-1 is rotated, the variable driving arm 422-2 may be rotated about the fixed center of rotation X3 together with the variable motor 422-1. Meanwhile, when the variable motor 422-1 is driven, the opposite end portion of the variable driving arm 422-2 may be rotated about the variable center of rotation X4. In other words, the angle by which the opposite end portion of the variable driving arm 422-2 is rotated relative to the main rotary part 110 may be defined as the sum of the angle by which the variable motor 422-1 is rotated and the angle by which the opposite end portion of the variable driving arm 422-2 is rotated relative to the variable motor 422-1. The variable rotary part 120 may be moved relative to the main rotary part 110 together with the opposite end portion of the variable driving arm 422-2.

The controller 30 may control the driving part 400. The controller 30 may determine the main angular velocity by controlling the first driving part 410. In addition, the controller 30 may determine the position of the variable rotary part 120 on the allowable movement region by controlling the second driving part 420.

An acceleration command may be input to the controller 30 such that the travel speed of the movable object 1 is increased. For example, when the acceleration command is input to the controller 30, the controller 30 may control the driving part 400 to increase the spoke speed of a contact spoke. The contact spoke may mean a spoke brought into contact with the ground among the plurality of spokes 200. The spoke speed may be defined as the speed of the outer end portion 201 of the spoke relative to the first rotational axis X1 when the movable object 1 travels at the travel speed.

When the acceleration command is input to the controller 30 such that the travel speed of the movable object 1 reaches a speed lower than a critical travel speed, the controller 30 may control the first driving part 410 to increase the main angular velocity and may control the second driving part 420 to place the plurality of spokes 200 in the first posture. The critical travel speed may be defined as the travel speed of the movable object 1 when the plurality of spokes 200 are placed in the first posture and the main angular velocity is maximal.

Furthermore, when the acceleration command is input to the controller 30 such that the travel speed of the movable object 1 reaches a speed higher than the critical travel speed, the controller 30 may control the first driving part 410 such that the main angular velocity is increased to a maximum and may perform angle control for controlling the second driving part such that the plurality of spokes 200 are switched from the first posture to the second posture.

When the controller 30 performs the angle control, the second driving part 420 may move the variable rotary part to increase the angle formed by the contact spoke and an adjacent spoke. The adjacent spoke may be defined as a spoke 200 that is adjacent to the contact spoke and disposed in the reverse rotational direction C2 with respect to the contact spoke, among the plurality of spokes 200. For example, when the controller 30 performs the angle control, the second driving part 420 may move the variable rotary part 120 toward an in-between region that is a region of the main rotary part 110 formed between the contact spoke and the adjacent spoke. The in-between region may be defined as a region of the edge area of the main rotary part 110 disposed between the contact spoke and the adjacent spoke.

The controller 30 may be implemented with a process that is electrically connected with the driving part 400 and has a function of decoding and executing a command based on previously input information.

Meanwhile, according to another implementation of the present disclosure, when the acceleration command is input to the controller 30 such that the travel speed of the movable object 1 reaches a target travel speed, the controller 30 may determine a plurality of target spoke speeds. The plurality of target spoke speeds may be defined as the speeds of the outer end portions 201 of the plurality of spokes.

The controller 30 may calculate the main angular velocity, a first rotational angular velocity, and a second rotational angular velocity, based on the plurality of determined target spoke speeds. The first rotational angular velocity may be defined as the rotational angular velocity of the one end portion of the fixed driving arm 421-2 when the one end portion of the fixed driving arm 421-2 is rotated about the fixed center of rotation X3. The second rotational angular velocity may be defined as the rotational angular velocity of the opposite end portion of the variable driving arm 422-2 when the opposite end portion of the variable driving arm 422-2 is rotated about the variable center of rotation X4.

Figure 11:
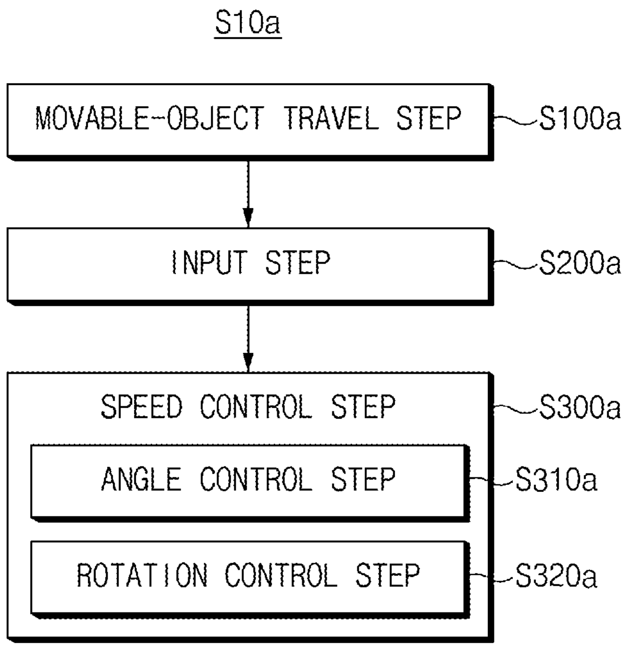
FIG. 11 is a flowchart illustrating a method of controlling the movable object according to an implementation of the present disclosure.

Hereinafter, a method S10*a* of controlling the movable object according to an implementation of the present disclosure will be described with reference to FIG. 11.

The method S10*a* of controlling the movable object may include a movable-object travel step S100*a*, an input step S200*a*, and a speed control step S300*a*.

In the movable-object travel step S100*a*, the movable object 1 may travel on the ground at the travel speed.

In the input step S200*a*, an acceleration command may be input to the controller 30 such that the travel speed of the movable object 1 is increased. For example, in the input step S200*a*, the acceleration command may be input to the controller 30 such that the travel speed of the movable object 1 is higher or lower than the critical travel speed.

In the speed control step S300*a*, the spoke speed of a spoke brought into contact with the ground among the plurality of spokes 200 may be increased when the acceleration command is input to the controller 30 in the input step S200*a*. The speed control step S300*a* may include an angle control step S310*a* and a rotation control step S320*a*.

In the angle control step S310*a*, the postures of the plurality of spokes 200 may be controlled. The angle control step S310*a* may be performed when the acceleration command is input to the controller 30 such that the travel speed of the movable object 1 reaches a speed higher than the critical travel speed. In the angle control step S310*a*, the angle formed by the contact spoke and the adjacent spoke may be increased. When the angle control step S310*a* is performed, the wheel assembly 10 may obtain the same effect as increasing a person's step as the angle formed by the contact spoke and the adjacent spoke is increased. In addition, when the angle control step S310*a* is performed, the plurality of spokes 200 may be switched from the first posture to the second posture.

In the rotation control step S320*a*, the main angular velocity may be controlled. For example, when the acceleration command is input to the controller 30 such that the travel speed of the movable object 1 reaches a speed lower than the critical travel speed, the main angular velocity may be increased in the rotation control step S320*a* such that the main angular velocity reaches an angular velocity lower than the maximum main angular velocity. Furthermore, when the acceleration command is input to the controller 30 such that the travel speed of the movable object 1 reaches a speed higher than the critical travel speed, the main angular velocity may be increased to a maximum in the rotation control step S320*a*.

Figure 12:
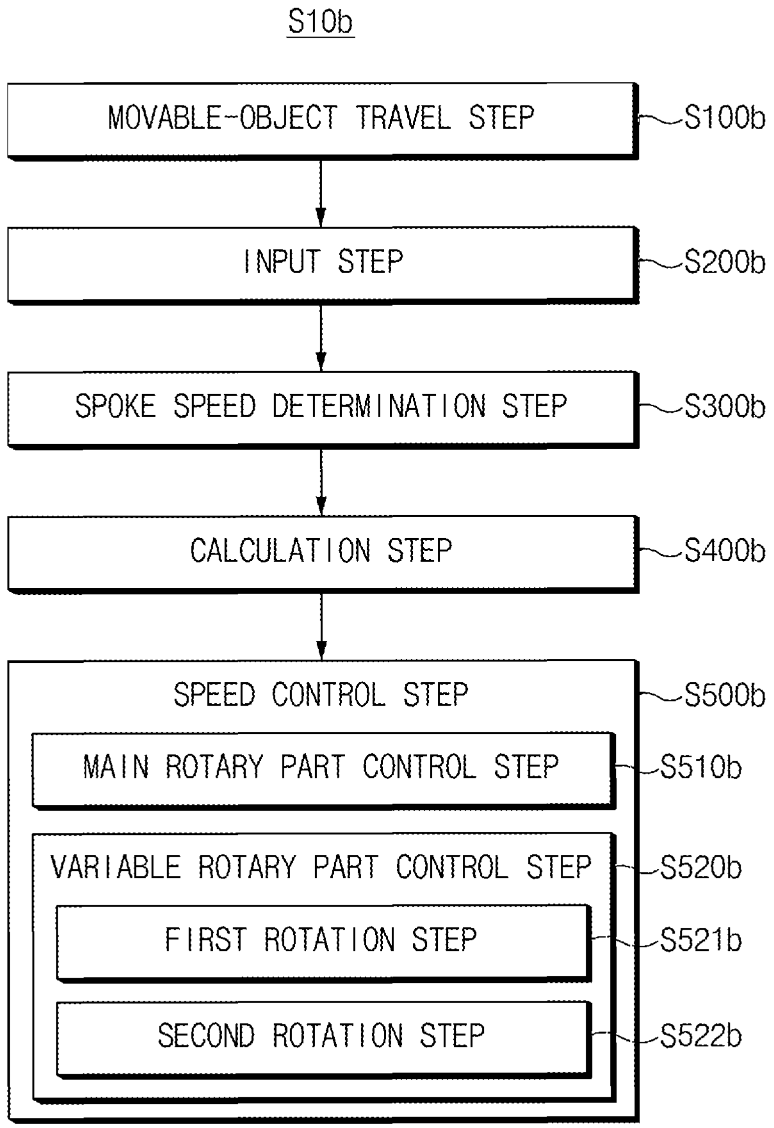
FIG. 12 is a flowchart illustrating a method of controlling the movable object according to another implementation of the present disclosure.

Hereinafter, a method S10*b* of controlling the movable object according to another implementation of the present disclosure will be described with reference to FIG. 12.

The method S10*b* of controlling the movable object may include a movable-object travel step S100*b*, an input step S200*b*, a spoke speed determination step S300*b*, a calculation step S400*b*, and a speed control step S500*b*. The description of the movable-object travel step S100*a* according to the implementation of the present disclosure is applied to the movable-object travel step S100*b*.

In the input step S200*b*, an acceleration command (hereinafter, referred to as the target acceleration command) may be input to the controller 30 such that the travel speed of the movable object 1 reaches the target travel speed.

In the spoke speed determination step S300*b*, a plurality of target spoke speeds that are spoke speeds of the outer end portions 201 of the plurality of spokes may be determined when the target acceleration command is input to the controller 30.

In the calculation step S400*b*, the main angular velocity, the first rotational angular velocity, and the second rotational angular velocity may be calculated based on the plurality of determined target spoke speeds.

In the speed control step S500*b*, based on the main angular velocity, the first rotational angular velocity, and the second rotational angular velocity, the main rotary part 110 may be rotated, and the variable rotary part 120 may be moved relative to the main rotary part 110. The speed control step S500*b* may include a main rotary part control step S510*b* and a variable rotary part control step S520*b*.

In the main rotary part control step S510*b*, the main rotary part 110 may be rotated at the calculated main angular velocity.

In the variable rotary part control step S520*b*, the variable rotary part 120 may be moved relative to the main rotary part 110, based on the first rotational angular velocity and the second rotational angular velocity. The variable rotary part control step S520*b* and the main rotary part control step S510*b* may be performed at the same time or at different times. The variable rotary part control step S520*b* may include a first rotation step S521*b* and a second rotation step S522*b*.

In the first rotation step S521*b*, the one end portion of the fixed driving arm 421-2 may be rotated about the fixed center of rotation X3 at the first rotational angular velocity.

Furthermore, in the second rotation step S522*b*, the opposite end portion of the variable driving arm 422-2 may be rotated about the variable center of rotation X4 at the second rotational angular velocity. The first rotation step S521*b* and the second rotation step S522*b* may be performed at the same time or at different times.

According to the present disclosure, the movable object has the structure in which the angular velocity of the main rotary part and the angular velocity of the variable rotary part are equal to each other without a separate control process. Thus, a control process required for driving is simplified.

Hereinabove, even though all of the components are coupled into one body or operate in a combined state in the description of the above-mentioned implementations of the present disclosure, the present disclosure is not limited to these implementations. That is, all of the components may operate in one or more selective combination within the range of the purpose of the present disclosure.

Hereinabove, although the present disclosure has been described with reference to exemplary implementations and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A movable object comprising a wheel assembly, wherein the wheel assembly includes:

a main rotary part configured to rotate about a first rotational axis; and a variable rotary part configured to move relative to the main rotary part in a direction intersecting with the first rotational axis, and wherein the variable rotary part is configured to, based on the main rotary part rotating, rotate at a main angular velocity, the main angular velocity being an angular velocity of the main rotary part, wherein the wheel assembly further includes:

a plurality of spokes, each of the plurality of spokes including an outer end portion configured to move with respect to the first rotational axis based on (i) the main rotary part rotating and (ii) the variable rotary part moving relative to the main rotary part, and a driving part including:

a first driving part configured to rotate the main rotary part, and a second driving part configured to move the variable rotary part relative to the main rotary part, wherein the movable object further comprises a controller configured to control the driving part, wherein the controller is configured to control the first driving part and the second driving part to thereby increase a spoke speed of a spoke that contacts a ground among the plurality of spokes based on an acceleration command being input to the controller to increase a travel speed of the movable object, wherein the second driving part includes:

a fixed driving part including a fixed driving arm having one end portion configured to rotate about a fixed center of rotation at a first rotational angular velocity, and a variable driving part including a variable driving arm having one end portion connected to the fixed driving arm and an opposite end portion connected to the variable rotary part, the variable driving arm being configured to rotate about a variable center of rotation at a second rotational angular velocity, wherein the variable center of rotation passes through the fixed driving arm and is spaced apart from the fixed center of rotation, and wherein the controller is configured to, based on the acceleration command being input to the controller to enable the travel speed of the movable object to reach a target travel speed, (i) determine a plurality of target spoke speeds corresponding to spoke speeds of the outer end portions of the plurality of spokes, (ii) calculate the main angular velocity, the first rotational angular velocity, and the second rotational angular velocity based on the plurality of determined target spoke speeds, and (iii) control the driving part based on the calculated main angular velocity, the calculated first rotational angular velocity, and the calculated second rotational angular velocity.

2. The movable object of claim 1, wherein inner end portions of the plurality of spokes are connected to an edge of the variable rotary part and configured to rotate, wherein the plurality of spokes are configured to be in a first posture in which the variable rotary part rotates about the first rotational axis, and wherein the controller is configured to, based on the acceleration command being input to the controller to enable the travel speed of the movable object to reach a speed lower than a critical travel speed, control (i) the first driving part to increase the main angular velocity and (ii) the second driving part to place the plurality of spokes in the first posture, the critical travel speed being a travel speed of the movable object based on the plurality of spokes being placed in the first posture and the main angular velocity being maximal.

3. The movable object of claim 2, wherein the plurality of spokes are configured to be in a second posture in which the variable rotary part rotates about a second rotational axis spaced apart from the first rotational axis, and wherein the controller is configured to, based on the acceleration command being input to the controller to enable the travel speed of the movable object to reach a speed higher than the critical travel speed, (i) control the first driving part to increase the main angular velocity to a maximum and (ii) perform angle control to control the second driving part to switch the plurality of spokes from the first posture to the second posture.

4. The movable object of claim 3, wherein the inner end portions of the plurality of spokes are connected to the edge of the variable rotary part in a forward rotational direction and configured to rotate, and wherein the second driving part is configured to, based on the angle control being performed, move the variable rotary part to increase an angle defined by (i) a contact spoke, among the plurality of spokes, that has an outer end portion that contacts the ground and (ii) an adjacent spoke, among the plurality of spokes, that is adjacent to the contact spoke and disposed in a reverse rotational direction opposite to the forward rotational direction with respect to the contact spoke.

5. The movable object of claim 4, wherein the second driving part is configured to, based on the angle control being performed, move the variable rotary part toward an in-between region of the main rotary part defined between the contact spoke and the adjacent spoke based on the movable object being viewed along the first rotational axis.

6. A method for controlling a movable object wherein the movable object includes:

a main rotary part configured to rotate about a first rotational axis, a variable rotary part configured to move relative to the main rotary part and rotate at a main angular velocity, the main angular velocity being an angular velocity of the main rotary part, and a plurality of spokes, each of the plurality of spokes including an outer end portion configured to move with respect to the first rotational axis based on the main rotary part rotating and the variable rotary part moving relative to the main rotary part, the method comprising:

controlling the movable object to travel at a travel speed;

inputting an acceleration command to a controller to increase the travel speed of the movable object; and based on the acceleration command being input to the controller, increasing a spoke speed of a spoke that contacts a ground among the plurality of spokes, wherein controlling the main angular velocity includes moving the variable rotary part relative to the main rotary part, wherein moving the variable rotary part includes:

rotating one end portion of a fixed driving arm about a fixed center of rotation at a first rotational angular velocity, and rotating a variable driving arm about a variable center of rotation at a second rotational angular velocity, the variable driving arm having one end portion connected to the fixed driving arm and an opposite end portion connected to the variable rotary part, the variable center of rotation being spaced apart from the fixed center of rotation and configured to pass through the fixed driving arm, wherein the method further comprises:

determining a plurality of target spoke speeds being spoke speeds of the outer end portions of the plurality of spokes, based on the acceleration command being input to the controller to enable the travel speed of the movable object to reach a target travel speed, and calculating the main angular velocity, the first rotational angular velocity, and the second rotational angular velocity, based on the plurality of target spoke speeds being determined, and wherein, based on a spoke speed of a spoke being increased:

the main rotary part is configured to rotate based on the main angular velocity, the first rotational angular velocity, and the second rotational angular velocity being calculated, and the variable rotary part is configured to move relative to the main rotary part.

7. The method of claim 6, wherein inner end portions of the plurality of spokes are connected to an edge of the variable rotary part, wherein the plurality of spokes are configured to be in a first posture in which the variable rotary part rotates about the first rotational axis, wherein increasing the spoke speed includes:

controlling the main angular velocity, and controlling postures of the plurality of spokes, wherein, based on the acceleration command being input to the controller to enable the travel speed of the movable object to reach a speed lower than a critical travel speed:

the main angular velocity is configured to increase based on the main angular velocity being controlled, and the plurality of spokes are configured to be placed in the first posture based on the postures of the plurality of spokes being controlled, and wherein the critical travel speed is a travel speed of the movable object based on the plurality of spokes being placed in the first posture and the main angular velocity being maximal.

8. The method of claim 7, wherein the plurality of spokes are configured to be in a second posture in which the variable rotary part rotates about a second rotational axis spaced apart from the first rotational axis, and wherein based on the acceleration command being input to the controller to enable the travel speed of the movable object to reach a speed higher than the critical travel speed:

the main angular velocity is configured to increase to a maximum based on the main angular velocity being controlled, and the variable rotary part is configured to move relative to the main rotary part based on the postures of the plurality of spokes being controlled such that the plurality of spokes are switched from the first posture to the second posture.

9. The method of claim 8, wherein the inner end portions of the plurality of spokes are connected to the edge of the variable rotary part in a forward rotational direction, and wherein, based on the acceleration command being input to the controller to enable the travel speed of the movable object to reach a speed higher than the critical travel speed:

an angle is increased based on the postures of the plurality of spokes being controlled, the angle being defined by (i) a contact spoke, among the plurality of spokes, that has one end portion contacting the ground and (ii) an adjacent spoke, among the plurality of spokes, that is adjacent to the contact spoke and disposed in a reverse rotational direction opposite to the forward rotational direction.

10. A wheel assembly for a movable object, the wheel assembly comprising:

a main rotary part configured to rotate about a first rotational axis;

a variable rotary part configured to move relative to the main rotary part in a direction intersecting with the first rotational axis;

a plurality of spokes, each of the plurality of spokes including an outer end portion configured to move with respect to the first rotational axis based on (i) the main rotary part rotating and (ii) the variable rotary part moving relative to the main rotary part; and a driving part including:

a first driving part configured to rotate the main rotary part, and a second driving part configured to move the variable rotary part relative to the main rotary part, wherein the movable object further comprises a controller configured to control the driving part, and wherein the controller is configured to control the first driving part and the second driving part to thereby increase a spoke speed of a spoke that contacts a ground among the plurality of spokes based on an acceleration command being input to the controller to increase a travel speed of the movable object, wherein the variable rotary part is configured to, based on the main rotary part rotating, rotate at a main angular velocity, the main angular velocity being an angular velocity of the main rotary part, wherein the second driving part includes:

a fixed driving part including a fixed driving arm having one end portion configured to rotate about a fixed center of rotation at a first rotational angular velocity. and a variable driving part including a variable driving arm having one end portion connected to the fixed driving arm and an opposite end portion connected to the variable rotary part, the variable driving arm being configured to rotate about a variable center of rotation at a second rotational angular velocity, wherein the variable center of rotation passes through the fixed driving arm and is spaced apart from the fixed center of rotation.

11. The wheel assembly of claim 10, wherein inner end portions of the plurality of spokes are connected to an edge of the variable rotary part and configured to rotate, wherein the plurality of spokes are configured to be in a first posture in which the variable rotary part rotates about the first rotational axis, and wherein the controller is configured to, based on the acceleration command being input to the controller to enable the travel speed of the movable object to reach a speed lower than a critical travel speed, control (i) the first driving part to increase the main angular velocity and (ii) the second driving part to place the plurality of spokes in the first posture, the critical travel speed being a travel speed of the movable object based on the plurality of spokes being placed in the first posture and the main angular velocity being maximal.

12. The wheel assembly of claim 11, wherein the plurality of spokes are configured to be in a second posture in which the variable rotary part rotates about a second rotational axis spaced apart from the first rotational axis, and wherein the controller is configured to, based on the acceleration command being input to the controller to enable the travel speed of the movable object to reach a speed higher than the critical travel speed, (i) control the first driving part to increase the main angular velocity to a maximum and (ii) perform angle control to control the second driving part to switch the plurality of spokes from the first posture to the second posture.

13. The wheel assembly of claim 12, wherein the inner end portions of the plurality of spokes are connected to the edge of the variable rotary part in a forward rotational direction and configured to rotate, and wherein the second driving part is configured to, based on the angle control being performed, move the variable rotary part to increase an angle defined by (i) a contact spoke, among the plurality of spokes, that has an outer end portion that contacts the ground and (ii) an adjacent spoke, among the plurality of spokes, that is adjacent to the contact spoke and disposed in a reverse rotational direction opposite to the forward rotational direction with respect to the contact spoke.

14. The wheel assembly of claim 13, wherein the second driving part is configured to, based on the angle control being performed, move the variable rotary part toward an in-between region of the main rotary part defined between the contact spoke and the adjacent spoke based on the movable object being viewed along the first rotational axis.

15. The wheel assembly of claim 10, wherein the controller is configured to, based on the acceleration command being input to the controller to enable the travel speed of the movable object to reach a target travel speed, (i) determine a plurality of target spoke speeds corresponding to spoke speeds of the outer end portions of the plurality of spokes, (ii) calculate the main angular velocity, the first rotational angular velocity, and the second rotational angular velocity based on the plurality of determined target spoke speeds, and (iii) control the driving part based on the calculated main angular velocity, the calculated first rotational angular velocity, and the calculated second rotational angular velocity.

* * * * *